United States Patent [19]

Claar et al.

[11] Patent Number: 5,372,178

[45] Date of Patent: * Dec. 13, 1994

[54] METHOD OF PRODUCING CERAMIC COMPOSITE BODIES

[75] Inventors: Terry D. Claar, Newark; Gerhard H. Schiroky, Hockessin, both of Del.; Donald P. Ripa, Frederick, Md.; William B. Johnson, Newark, Del.

[73] Assignee: Lanxide Technology Company, LP, Newark, Del.

[*] Notice: The portion of the term of this patent subsequent to Apr. 5, 2011 has been disclaimed.

[21] Appl. No.: 823,009

[22] Filed: Jan. 15, 1992

Related U.S. Application Data

[63] Continuation of Ser. No. 551,486, Jul. 12, 1990, abandoned, which is a continuation-in-part of Ser. No. 296,770, Jan. 13, 1989, abandoned.

[51] Int. Cl.⁵ ............................................. B22D 19/00
[52] U.S. Cl. ................................... 164/98; 164/108; 164/112; 264/60; 264/86; 264/317
[58] Field of Search ........................ 264/60, 317, 86; 164/98, 108, 112

[56] References Cited

U.S. PATENT DOCUMENTS

| | | | |
|---|---|---|---|
| 3,758,662 | 9/1973 | Tobin | 264/332 |
| 3,864,154 | 2/1975 | Gazza et al. | 29/123 B |
| 4,471,059 | 9/1984 | Yoshino et al. | 501/96 |
| 4,544,524 | 10/1985 | Mizrah et al. | 419/9 |
| 4,585,618 | 4/1986 | Fresnel | 419/12 |
| 4,591,470 | 5/1986 | Goto et al. | 264/317 |
| 4,595,545 | 6/1986 | Sane | 264/65 |
| 4,605,440 | 8/1986 | Halverson | 75/238 |
| 4,692,418 | 9/1987 | Boecker et al. | 501/90 |
| 4,702,770 | 10/1987 | Pyzik | 75/236 |
| 4,713,360 | 12/1987 | Newkirk et al. | 501/87 |
| 4,718,941 | 1/1988 | Halverson | 75/236 |
| 4,777,014 | 10/1988 | Newkirk et al. | 419/12 |
| 4,793,968 | 12/1988 | Mosser et al. | 419/17 X |
| 4,830,799 | 5/1989 | La Roche | 264/59 |
| 4,834,938 | 5/1989 | Pyzik et al. | 419/6 |
| 4,885,130 | 12/1989 | Claar et al. | 419/12 |
| 4,885,131 | 12/1989 | Newkirk | 419/12 |
| 4,891,338 | 1/1990 | Gesing et al. | 501/91 |
| 4,915,736 | 4/1990 | Claar et al. | 75/238 |
| 4,916,113 | 4/1990 | Newkirk | 501/89 |
| 4,940,679 | 7/1990 | Claar et al. | 501/96 |
| 5,004,714 | 4/1991 | Claar et al. | 501/134 |
| 5,010,044 | 4/1991 | Newkirk | 501/93 |
| 5,017,334 | 5/1991 | Claar et al. | 419/12 |
| 5,019,539 | 5/1991 | Claar et al. | 501/87 |
| 5,066,622 | 11/1991 | Claar et al. | 501/87 |

FOREIGN PATENT DOCUMENTS

| | | |
|---|---|---|
| 0165707 | 12/1985 | European Pat. Off. . |
| 0193292 | 9/1986 | European Pat. Off. . |
| 0239520 | 9/1987 | European Pat. Off. . |
| 62-72505 | 4/1987 | Japan ................. 264/317 |
| 1492477 | 11/1977 | United Kingdom . |

Primary Examiner—James Derrington
Attorney, Agent, or Firm—Mark G. Mortenson; Carol A. Lewis

[57] ABSTRACT

This invention relates generally to a novel method of preparing self-supporting bodies, and novel products made thereby. In its more specific aspects, this invention relates to a method for producing self-supporting bodies comprising one or more boron-containing compounds (e.g., a boride or a boride and a carbide, etc.) by reactive infiltration of molten parent metal into a preform comprising boron carbide or a boron donor material combined with a carbon donor material and, optionally, one or more inert fillers, to form the body. Specifically, a boron carbide material or combination of a boron donor material and a carbon donor material, and in either case, optionally, one or more inert fillers, are sedimentation cast, spray coated, tapped, slip cast, pressed, etc., onto or into a body and into a particular desired shape.

19 Claims, 8 Drawing Sheets

METHOD OF PRODUCING CERAMIC COMPOSITE BODIES

CROSS-REFERENCE TO RELATED APPLICATION

This is a continuation of copending application Ser. No. 07/551,486 filed on Jul. 12, 1990 abandoned, which is a continuation-in-part of U.S. Ser. No. 07/296,770, which was filed on Jan. 13, 1989 (now abandoned).

FIELD OF THE INVENTION

This invention relates generally to a novel method of preparing self-supporting bodies, and novel products made thereby. In its more specific aspects, this invention relates to a method for producing self-supporting bodies comprising one or more boron-containing compounds (e.g., a boride and/or a boride and a carbide) by reactive infiltration of molten parent metal into a preform comprising boron carbide or a boron donor material combined with a carbon donor material and, optionally, one or more inert fillers, to form the body. Specifically, a boron carbide material or combination of a boron donor material and a carbon donor material, and in either case, optionally, one or more inert fillers, are, for example, sedimentation cast, slip cast, isostatically pressed, spray coated, etc., onto or into a mold to form a preform having a particular desired shape, and the material is subsequently reactively infiltrated with a molten parent metal.

BACKGROUND OF THE PRESENT INVENTION

In recent years, there has been an increasing interest in the use of ceramics for structural applications historically served by metals. The impetus for this interest has been the relative superiority of ceramics, when compared to metals, with respect to certain properties, such as corrosion resistance, hardness, wear resistance, modulus of elasticity and refractory capabilities.

However, a major limitation on the use of ceramics for such purposes is the feasibility and cost of producing the desired ceramic structures. For example, the production of ceramic boride bodies by the methods of hot pressing, reaction sintering, and reaction hot pressing is well known.

While there has been some limited success in producing ceramic boride bodies according to the above-discussed methods, there is still a need for a more effective and economical method to prepare dense boride-containing materials.

In addition, a second major limitation on the use of ceramics for structural applications is that ceramics generally exhibit a lack of toughness (i.e., damage tolerance, or resistance to fracture). Such lack of toughness tends to result in sudden, easily induced, catastrophic failure of ceramics in applications involving rather moderate tensile stresses. This lack of toughness tends to be particularly common in monolithic ceramic boride bodies.

One approach to overcome the above-discussed problem has been the attempt to use ceramics in combination with metals, for example, as cermets or metal matrix composites. The objective of this known approach is to obtain a combination of the best properties of the ceramic (e.g., hardness and/or stiffness) and the best properties of the metal (e.g., ductility). While there has been some general success in the cermet area in the production of boride compounds, there still remains a need for more effective and economical methods to prepare dense boride-containing materials.

DISCUSSION OF RELATED PATENTS AND PATENT APPLICATIONS

Many of the above-discussed problems associated with the production of boride-containing materials have been addressed in U.S. Pat. No. 4,885,130 (hereinafter "Patent '130"), which issued on Dec. 5, 1989, in the names of T. Dennis Claar et al., and is entitled "A Process for Preparing Self-Supporting Bodies and Products Produced Thereby".

Briefly summarizing the disclosure of Patent '130, self-supporting ceramic bodies are produced by utilizing a parent metal infiltration and reaction process (i.e., reactive infiltration) in the presence of a mass comprising boron carbide. Particularly, a bed or mass comprising boron carbide and, optionally, one or more of a boron donor material and a carbon donor material, is infiltrated by molten parent metal, and the bed may be comprised entirely of boron carbide or only partially of boron carbide, thus resulting in a self-supporting body comprising, at least in part, one or more parent metal boron-containing compounds, which compounds include a parent metal boride or a parent metal boro carbide, or both, and typically also may include a parent metal carbide. It is also disclosed that the mass comprising boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of Patent '130, a mass comprising boron carbide and, optionally, one or more of a boron donor material and a carbon donor material, is placed adjacent to or in contact with a body of molten metal or metal alloy, which is melted in a substantially inert environment within a particular temperature envelope. The molten metal infiltrates the mass comprising boron carbide and reacts with at least the boron carbide to form at least one reaction product. The boron carbide (and/or the boron donor material and/or the carbon donor material) is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted mass comprising boron carbide by a wicking or a capillary action. This transported metal forms additional parent metal boride, carbide, and/or boro carbide and the formation or development of a ceramic body is continued until either the parent metal or mass comprising boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in Patent '130, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the mass comprising boron carbide, the relative amounts of boron carbide and parent metal, alloys of the parent metal, dilution of the boron carbide with a filler, the amount of boron donor material and/or carbon donor material mixed with the mass comprising boron carbide, temperature, and time. Preferably, conversion of the boron carbide to the parent metal boride, parent metal boro compound(s) and parent metal carbide is at least about 50%, and most preferably at least about 90%.

The typical environment or atmosphere which was utilized in Patent '130 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Still further, it is disclosed that by adding a carbon donor material (e.g., graphite powder or carbon black) and/or a boron donor material (e.g., a boron powder, silicon borides, nickel borides and iron borides) to the mass comprising boron carbide, the ratio of parent metal-boride/parent metal-carbide can be adjusted. For example, if zirconium is used as the parent metal, the ratio of $ZrB_2/ZrC$ can be reduced if a carbon donor material is utilized (i.e., more ZrC is produced due to the addition of a carbon donor material in the mass of boron carbide) while if a boron donor material is utilized, the ratio of $ZrB_2/ZrC$ can be increased (i.e., more $ZrB_2$ is produced due to the addition of a boron donor material in the mass of boron carbide). Still further, the relative size of $ZrB_2$ platelets which are formed in the body may be larger than platelets that are formed by a similar process without the use of a boron donor material. Thus, the addition of a carbon donor material and/or a boron donor material may also effect the morphology of the resultant material.

In another related Patent, specifically, U.S. Pat. No. 4,915,736 (hereinafter referred to as "Patent '736"), issued in the names of Terry Dennis Claar and Gerhard Hans Schiroky, on Apr. 10, 1990, and entitled "A Method of Modifying Ceramic Composite Bodies By a Carburization Process and Articles Produced Thereby", additional modification techniques are disclosed. Specifically, Patent '736 discloses that a ceramic composite body made in accordance with the teachings of, for example, Patent '130 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a non-reactive gas such as argon. It is not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, Patent '736 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between about 5–30 volume percent, such composite body could be modified by a post-carburization treatment to result in from about 0 to about 2 volume percent, typically about ½ to about 2 volume percent, of parent metal remaining in the composite body.

U.S. Pat. No. 4,885,131 (hereinafter "Patent '131"), issued in the name of Marc S. Newkirk on Dec. 5, 1989, and entitled "Process For Preparing Self-Supporting Bodies and Products Produced Thereby", discloses additional reactive infiltration formation techniques. Specifically, Patent '131 discloses that self-supporting bodies can be produced by a reactive infiltration of a parent metal into a mixture of a bed or mass comprising a boron donor material and a carbon donor material. The relative amounts of reactants and process conditions may be altered or controlled to yield a body containing varying volume percents of ceramic, metals, ratios of one ceramic or another and porosity.

In another related patent application, specifically, copending U.S. patent application Ser. No. 07/296,770 (hereinafter referred to as "Application '770"), filed in the names of Terry Dennis Claar et al., on Jan. 13, 1989, and entitled "A Method of Producing Ceramic Composite Bodies", additional reactive infiltration formation techniques are disclosed. Specifically, Application '770 discloses various techniques for shaping a bed or mass comprising boron carbide into a predetermined shape and thereafter reactively infiltrating the bed or mass comprising boron carbide to form a self-supporting body of a desired size and shape.

U.S. Pat. application Ser. No. 07/296,837, filed in the name of Terry Dennis Claar on Jan. 13, 1989, and entitled "A Method of Bonding A Ceramic Composite Body to a Second Body and Articles Produced Thereby", discloses various bonding techniques for bonding self-supporting bodies to second materials. Particularly, this patent application discloses that a bed or mass comprising one or more boron-containing compounds is reactively infiltrated by a molten parent metal to produce a self-supporting body. Moreover, residual or excess metal is permitted to remain bonded to the formed self-supporting body. The excess metal is utilized to form a bond between the formed self-supporting body and another body (e.g., a metal body or a ceramic body of any particular size or shape).

The reactive infiltration of a parent metal into a bed or mass comprising boron nitride is disclosed in copending U.S. Pat. No. 4,904,446 (hereinafter "Patent '446"), issued in the names of Danny Ray White et al., on Feb. 27, 1990, and entitled "Process for Preparing Self-Supporting Bodies and Products Made Thereby". Specifically, this patent discloses that a bed or mass comprising boron nitride can be reactively infiltrated by a parent metal. A relative amount of reactants and process conditions may be altered or controlled to yield a body containing varying volume percents of ceramic, metal and/or porosity. Additionally, the self-supporting body which results comprises a boron-containing compound, a nitrogen-containing compound and, optionally, a metal. Additionally, inert fillers may be included in the formed self-supporting body.

A further post-treatment process for modifying the properties of produced ceramic composite bodies is disclosed in U.S. Pat. No. 5,004,714 (hereinafter "Patent '714"), which issued on Apr. 2, 1991, from U.S. patent application Ser. No. 07/296,966, filed in the names of Terry Dennis Claar et al., on Jan. 13, 1989, and entitled "A Method of Modifying Ceramic Composite Bodies By Post-Treatment Process and Articles Produced Thereby". Specifically, Patent 714 discloses that self-supporting bodies produced by a reactive infiltration technique can be post-treated by exposing the formed bodies to one or more metals and heating the exposed bodies to modify at least one property of the previously formed composite body. One specific example of a post-treatment modification step includes exposing a formed body to a siliconizing environment.

U.S. Pat. No. 5,019,539 (hereinafter "Patent '539"), which issued on May 28, 1991, from U.S. patent application Ser. No. 07/296,961 filed in the names of Terry Dennis Claar et al., on Jan. 13, 1989, and entitled "A Process for Preparing Self-Supporting Bodies Having Controlled Porosity and Graded Properties and Products Produced Thereby", discloses reacting a mixture of powdered parent metal with a bed or mass comprising boron carbide and, optionally, one or more inert fillers. Additionally, it is disclosed that both a powdered parent metal and a body or pool of molten parent metal can be induced to react with a bed or mass comprising boron carbide. The body which is produced is a body which has controlled or graded properties.

The disclosures of each of the above-discussed Commonly Owned U.S. Patent Applications and Patents are herein expressly incorporated by reference.

SUMMARY OF THE INVENTION

The present invention has been developed in view of the foregoing to overcome the deficiencies of the prior art.

The present invention relates to forming ceramic composite bodies of a desired configuration by reactively infiltrating a preform comprising boron carbide or a boron donor material combined with a carbon donor material. In a first preferred embodiment, a preform is prepared by, for example, sedimentation casting, slip casting, isostatically pressing, spray coating, tapping, dipping, extruding, etc., boron carbide onto or into a mold. Specifically, the boron carbide can be formed around a mold (e.g., a porous graphite mandrel) to form a preform having an interior portion which replicates the exterior surface of the mold. Alternatively, in a second embodiment, the boron carbide may be sedimentation cast or slip cast into a mold containing a cavity (e.g., a porous graphite container). In this manner, the shape of the boron carbide preform corresponds substantially to an interior portion of the porous graphite mold. In either of the above two embodiments, the boron carbide preform is subsequently reactively infiltrated by molten parent metal which will result in a self-supporting body comprising one or more parent metal boron-containing compounds, which compounds include a parent metal boride or a parent metal boro carbide, or both, and typically also may include a parent metal carbide. In addition, the mass to be infiltrated may contain one or more inert filler materials admixed with the boron carbide to produce a composite by reactive infiltration, which composite comprises a matrix of one or more boron-containing compounds embedding the inert filler, and also may include a parent metal carbide.

Upon reaction of the parent metal with the preform of boron carbide, the configuration of the resulting self-supporting body will correspond substantially to the shape of the boron carbide preform formed (e.g., slip cast, sediment cast, pressed, spray coated, tapped, dipped, extruded, etc.) onto or into the mold (e.g., porous graphite mold).

Alternatively, rather than utilizing a boron carbide material, a preform comprising a boron donor material (i.e., a boron-containing compound) and a carbon donor material (i.e., a carbon-containing compound), in any desired molar ratio, can be slip cast, sediment cast, pressed, spray coated, tapped, dipped, extruded, etc., in a procedure similar to that discussed above for boron carbide.

DEFINITIONS

"Parent metal" refers to that metal (e.g., zirconium) which is the precursor for the polycrystalline oxidation reaction product, that is, the parent metal boride or other parent metal boron compound, and includes that metal as a pure or relatively pure metal, a commercially available metal having impurities and/or alloying constituents therein, and an alloy in which that metal precursor is the major constituent; and when a specific metal is mentioned as the parent metal (e.g. zirconium), the metal identified should be read with this definition in mind unless indicated otherwise by the context.

"Parent metal boride" and "parent metal boro compounds" mean a reaction product containing boron formed upon reaction between boron carbide and the parent metal and includes a binary compound of boron with the parent metal as well as ternary or higher order compounds.

"Parent metal carbide" means a reaction product containing carbon formed upon reaction of boron carbide and parent metal.

DETAILED DESCRIPTION OF THE INVENTION AND PREFERRED EMBODIMENTS

Figure 1:
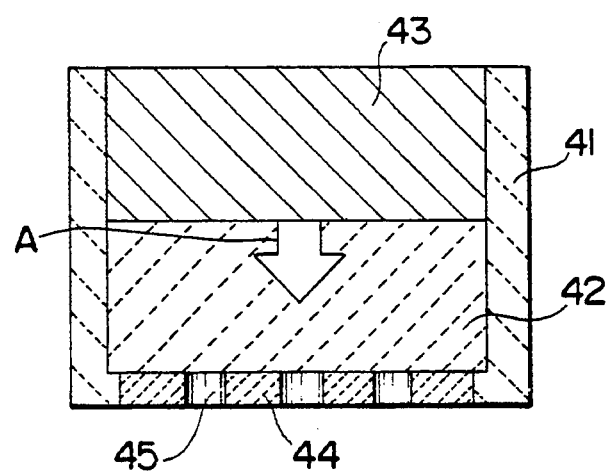
FIG. 1 is a cross-sectional view of a setup utilized to form the self-supporting bodies of the present invention.

In accordance with the present invention, a self-supporting body is produced by the reactive infiltration of a molten parent metal into boron carbide or a boron donor material combined with a carbon donor material to form a polycrystalline ceramic-containing body comprising the reaction product(s) of the parent metal with boron carbide, or the boron donor and carbon donor, and also may include one or more constituents of the parent metal.

Although the present invention is described with particular reference to boron carbide, this is for illustrative purposes only. The molten parent metal may react with any combination of a boron donor material and a carbon donor material to form the self-supporting bodies of the present invention. The boron donor material and carbon donor material, e.g., boron carbide, which is typically a solid at the process conditions, is preferably in fine particulate or powdered form. The environment or atmosphere for the process is chosen to be relatively inert or nonreactive under the process conditions. Argon or vacuum, for example, would be suitable process atmospheres. The resulting product comprises one or more of (a) a parent metal boride, (b) a boro compound, (c) usually a parent metal carbide, and (d) metal (e.g., residual parent metal). Also, the self-supporting body produced may exhibit porosity or voids. The compositions and proportions of the constituents in the reaction product may depend upon (1) the amount and composition of the parent metal, (2) the amount and composition of the reactants (e.g., boron carbide), and (3) the reaction conditions. For example, the characteristics of the reaction product may be controlled by utilizing a preform possessing a desired molar ratio and quantity of reactants such as B, C, and/or By C.

In a preferred embodiment of the present invention, the parent metal and a preform of boron carbide are positioned adjacent each other so that reactive infiltration will be in the direction towards and into the preform. The preform, which may be slip cast, sedimentation cast, sprayed, extruded, dipped, dry pressed, isostatically pressed, tapped, etc., may optionally include an inert filler material, such as a reinforcing material, which is substantially inert under the process conditions. The reaction product may embed the inert filler within the preform without substantially disturbing or displacing the filler. Thus, no external forces are required which might damage or disturb the arrangement of the preform and no awkward or costly high temperature, high pressure processes and facilities are required to create the reaction product. Reactive infiltration of the parent metal into and with the boron carbide, which preferably is in particulate or powdered form, forms a composite typically comprising a parent metal boride and/or a parent metal boro compound. With aluminum as the parent metal, the reaction product may comprise an aluminum boro carbide (e.g. $Al_3B_{48}C_2$, $AlB_{12}C_2$, $AlB_{24}C_4$), and also may include metal, e.g. aluminum, and possibly other unreacted or unoxidized constituents of the parent metal. If zirconium is the parent metal, the resulting composite may comprise zirconium boride and zirconium carbide, as well as residual zirconium metal.

Although the present invention is hereinafter described with particular reference to certain preferred embodiments in which the parent metal comprises zirconium or aluminum, this is for illustrative purposes only. Other parent metals may be utilized such as silicon, titanium, hafnium, lanthanum, iron, calcium, vanadium, niobium, tantalum, tungsten, magnesium, chromium, molybdenum, zirconium, beryllium, and alloys thereof, etc. Specific examples for several such parent metals are given below.

Moreover, any preform formation technique may be utilized which provides a preform that may be reactively infiltrated with molten parent metal without substantially altering the configuration of the preform. However, the processing technique utilized should be capable of providing a preform possessing a geometry which substantially represents the shape of the final or formed composite (i.e., to permit formation of a net or near-net shaped composite). Further, the manner in which the parent metal is contacted with the preform to permit a reaction with the preform is not critical. Any technique may be utilized to supply the molten parent metal, so long as a sufficient quantity of parent metal is available to form the desired amount of reaction product (e.g., contacting the preform with a reservoir of parent metal, surrounding the preform with parent metal, etc.).

In the method of the present invention, the parent metal and the preformed boron carbide are placed in contact with each other, usually within an inert container (e.g., alumina), and this assembly, comprising the inert container and its contents, is placed in a furnace and heated, preferably in an inert atmosphere such as argon, above the melting point of the parent metal, but preferably below the melting point of the desired reaction product so as to form a body or pool of molten metal. It should be understood that the operable temperature range or preferred temperature may not extend over this entire interval. The specific temperature range will depend largely upon such factors as the composition of the parent metal and the desired phases in the resulting composite. Molten metal contacts the boron carbide, and a parent metal boride (e.g. zirconium diboride) and/or a parent metal carbide (e.g., zirconium carbide) are formed as the reaction product. Upon continued exposure to the boron carbide, the remaining molten metal is progressively drawn through the reaction product in the direction of and into the preform containing the boron carbide, to provide continued formation of reaction product at the interface between the molten metal and boron carbide. The product produced by this method comprises the reaction product(s) of the parent metal with the boron carbide, or may comprise a ceramic-metal composite comprising one or more unreacted or non-oxidized constituents of the parent metal. A substantial amount of the boron carbide may be reacted to form the reaction product(s), this amount preferably being at least about 50% and most preferably at least about 90%. The ceramic crystallites formed as the reaction product of the process may or may not be interconnected, but preferably are interconnected in three dimensions, and the metallic phases and any voids in the product are normally at least partially interconnected. Any porosity tends to result from a partial or nearly complete depletion of the parent metallic phase in favor of the formation of additional reaction product (e.g., in the case where stoichiometric reactants or excess boron carbide is present), but the volume percent of voids will depend upon factors such as temperature, time, type of parent metal, and the porosity of the preform containing the boron carbide.

Figure 3:
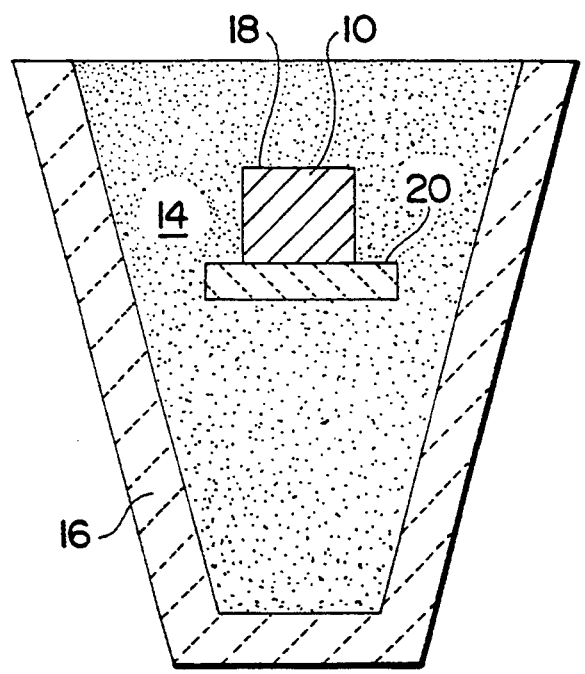
FIG. 3 is a cross-sectional view of a setup utilized to produce the self-supporting bodies of the present invention.
Figure 4:
FIG. 4 is a cross-sectional view of the self-supporting body produced in Example 1.
Figure 5:
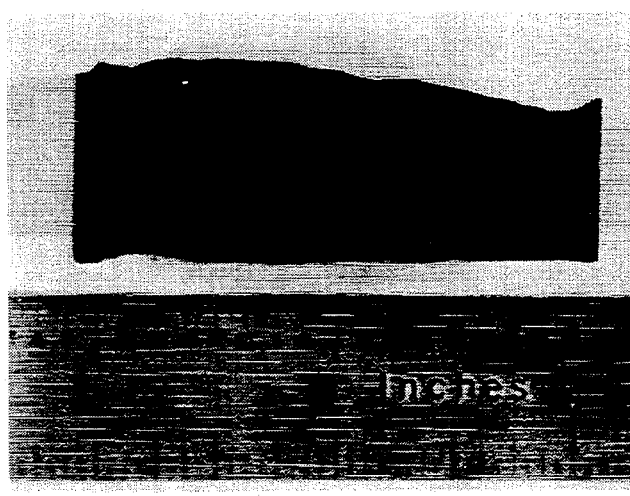
FIG. 5 is a cross-sectional view of the self-supporting body produced in Example 2.

It has been observed that products made in accordance with this invention using zirconium, titanium and hafnium as the parent metal form a parent metal boride characterized by a platelet-like structure. These platelets typically are unaligned or randomly oriented, as can be seen in FIGS. 3, 4 and 5. This platelet-like structure and the metallic phase appear to account at least in large part for the extraordinarily high fracture toughness of this composite, about $12 \times 10^{+6}$ Pascals meters$^{\frac{1}{2}}$ or higher, because of crack deflection and/or pull-out mechanisms.

In another aspect of the invention, there is provided a self-supporting body, including composite bodies, comprising a matrix of reaction product and, optionally, metallic constituents, embedding a substantially inert filler. The matrix is formed by the reactive infiltration of a parent metal into a preform of the inert filler intimately mixed with boron carbide. The filler material may be of any size or shape, and may be oriented with respect to the parent metal in any manner as long as the direction of development of the reaction product will be towards and will engulf at least a portion of the filler material without substantially disturbing or displacing it. The filler may be composed of or comprise any suitable material, such as ceramic and/or metal fibers, whiskers, particulates, powders, rods, wires, wire cloth, refractory cloth, plates, platelets, reticulated foam structure, solid or hollow spheres, etc. A particularly useful filler is alumina, but other oxides and ceramic fillers may be used depending on the starting materials and the end properties desired. Further, the filler material may be homogeneous or heterogeneous (e.g., a mixture of differing particle sizes, compositions, etc.). The filler materials may be bonded with any suitable binding agent (e.g. Avicil PH 105, from FMC Co.) which does not interfere with the reactions of this invention or leave any undesirable residual by-products within the final composite product. A filler which would tend to react excessively with the boron carbide or with the molten metal during processing may be coated so as to render the filler inert to the process environment. For example, carbon fiber, if used as a filler in conjunction with aluminum as the parent metal will tend to react with molten aluminum, but this reaction can be avoided if the fiber is first coated, e.g. with alumina.

Figure 2:
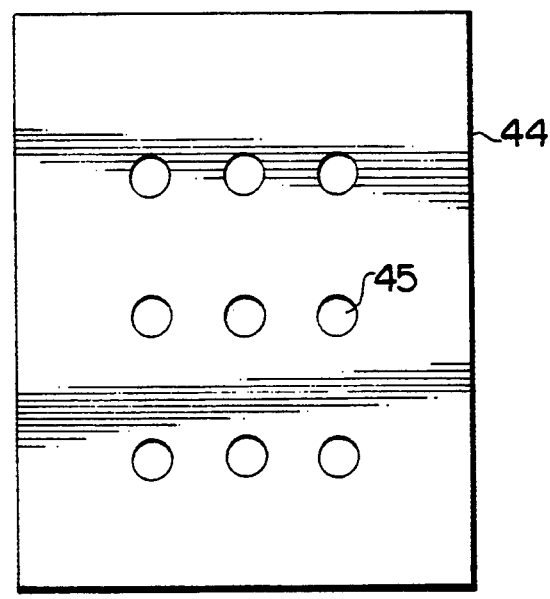
FIG. 2 is a frontal view of a bottom portion of a graphite refractory vessel having a plurality of through holes.

A suitable refractory container holding the parent metal and a preform comprising an inert filler admixed with boron carbide which is properly oriented to permit reactive infiltration of the parent metal into the preform and proper development of the composite, is placed in a furnace, and this lay-up is heated to a temperature above the melting point of the parent metal. At elevated temperatures, the molten parent metal infiltrates the preform by a wicking process and reacts with the boron carbide, thereby producing the desired ceramic or ceramic-metal composite body. Moreover, to assist in reducing the amount of final machining and finishing operations, a barrier material can surround the preform. The use of a graphite mold or mandrel is particularly useful as a barrier for such parent metals as zirconium, titanium, or hafnium, when used in combination with preforms made of, for example, boron carbide, boron nitride, boron and carbon. Still further, by placing an appropriate number of through-holes or venting means having a particular size and shape in the aforementioned graphite mold, or mandrel, the amount of porosity which typically occurs within a composite body manufactured according to the present invention, is reduced. Typically, a plurality of holes is placed in a bottom portion of the mold, or that portion of the mold or mandrel toward which reactive infiltration occurs. The holes function as a venting means which permit the removal of, for example, argon gas which has been trapped in the preform as the parent metal reactive infiltration front infiltrates the preform. FIG. 1 and FIG. 2 show a preform 42 in contact with a parent metal ingot 43, both of which are contained in a graphite refractory vessel 41. The graphite refractory vessel 41 has a bottom portion 44 having therein a plurality of through-holes 45 which function as a venting means. The through-holes 45 permit any gas trapped in the preform (e.g., argon) to escape as the parent metal reactive infiltration front infiltrates the preform (i.e., the reactive infiltration front penetrates the preform in the direction of the arrow "A" in FIG. 1). Thus, porosity in the formed composite body can be reduced.

A composite made by practicing this invention is illustrated in FIG. 3. The boron carbide, together with any desired inert filler materials, is fabricated into a preform with a shape corresponding to the desired geometry of the final composite. The preform 20 is superimposed with the parent metal precursor 10 and the assembly is surrounded by the inert material 14 contained within the crucible 16. The top surface 18 of the parent metal may or may not be exposed. The preform 20 may be prepared by any of a wide range of ceramic body formation methods (e.g., uniaxial pressing, isostatic pressing, slip casting, sedimentation casting, tape casting, extruding, injection molding, spraying, tapping, dipping, filament winding for fibrous materials, etc.) depending on the characteristics of the filler. Initial bonding of the filler particles, whiskers, fibers, or the like, prior to reactive infiltration may be obtained through light sintering or by use of various organic or inorganic binder materials which do not interfere with the process or contribute undesirable by-products to the finished material. The preform 20 is manufactured to have sufficient shape, integrity, and green strength, and should be permeable to the transport of molten metal, preferably having a porosity of between about 5 and 90% by volume and more preferably between about 25 and 75% by volume. In the case of an aluminum parent metal, suitable filler materials include, for example, silicon carbide, titanium diboride, alumina, and aluminum dodecaboride (among others), and as particulates typically having a mesh size of from about 14 to 1000, but any admixture of filler materials and mesh sizes may be used. The preform 20 is then contacted with molten parent metal on one or more of its surfaces for a time sufficient to complete infiltration of the matrix to the surface boundaries of the preform. The result of this preform method is a ceramic-metal composite body of a shape closely or exactly representing that desired in the final product, thus minimizing or eliminating expensive final machining or grinding operations.

While not wishing to be bound by any specific theory, it is believed that infiltration of the permeable preform by the parent metal is promoted by the presence of a boron source in the preform. Particularly, a small amount of boron source (e.g., boron carbide) has been shown to be effective, but the minimum can depend upon a number of factors such as type and particle size of the boron carbide, type of parent metal, type of filler, and process conditions. Thus, a wide variation of boron carbide concentrations can be provided in the filler, but the lower the concentration of boron carbide, the higher the volume percent of metal in the matrix. When very low amounts of the boron carbide are used (e.g., one to three weight percent based on the total weight of boron carbide plus filler), the resulting matrix comprises interconnected metal and a limited amount of parent metal boride and parent metal carbide dispersed in the metal (e.g., a metal matrix). In the absence of boron carbide, reactive infiltration of the filler may not occur, and infiltration may not be possible without special procedures, such as the application of external pressure to force the metal into the filler.

Because a wide range of reactants (e.g., boron carbide, a boron donor admixed with a carbon donor, etc.) and filler concentrations can be used in the process of this invention, it is possible to control or to modify the properties of the completed product by varying the concentration of boron carbide and/or the composition of the preform. When only a small amount of boron carbide is present relative to the amount of parent metal, such that the preform comprises a low density of boron carbide, the composite body or matrix properties are dominated by the properties of the parent metal, most typically ductility and toughness, because the matrix comprises predominantly metal (e.g., a metal matrix). Such a product may be advantageous for low or mid-range temperature applications. When a large amount of boron carbide is used, as for example when compound(s) having boron carbide particles are densely packed around a filler material or occupy a high percentage of space between constituents of the filler, the resulting body or matrix properties tend to be dominated by the parent metal boride and any parent metal carbide, in that the body or matrix would be harder or less ductile or less tough (e.g., a ceramic matrix). If the stoichiometry is closely controlled so as to achieve substantially complete conversion of the parent metal, the resulting product will contain little or no metal, which may be advantageous for high temperature applications of the product. Also, the substantially complete conversion of the parent metal could be significant especially in some high temperature applications, because the boride reaction product is more stable than boron carbide in that boron carbide will tend to react with residual or unoxidized metal (e.g., aluminum) present in the product. Where desired, elemental carbon may be admixed with the boron carbide preform or preform containing boron carbide and a filler. This excess carbon, typically varying from about 5 to 10 weight percent of the total bedding, reacts with the parent metal thereby assuring substantially complete reaction of the metal. This reaction of the metal with the carbon will depend largely on the relative amount of carbon used, the type, e.g. carbon black or graphite, and crystallinity. Selection among these extreme characteristics may be highly desirable to meet the needs of different potential applications for these products. For example, by adding about 5–75, preferably about 5–50, percent by weight of carbon black to a $B_4C$ preform and reactively infiltrating the preform with a zirconium metal, the ratio of $ZrB_2/ZrC$ can be lowered (i.e., more ZrC is formed).

Also, elemental boron may be admixed with the boron carbide preform (including a preform with filler) to facilitate reactive infiltration, particularly when using aluminum as the parent metal. Such an admixture reduces the cost of the preform relative to all boron carbide, results in the formation of a product containing a boro carbide such as aluminum boro carbide which possesses certain properties comparable to aluminum boride, and prevents the formation of aluminum carbide which is unstable in the presence of moisture and therefore degrades the structural properties of the product. In the admixture, the parent metal reacts with the elemental boron preferentially to form a metal boride, but the boro compound is formed as well.

Additional variations in the characteristics and properties of the composite can be created by controlling the infiltration conditions (e.g., time and temperature). Variables which can be manipulated include the nature and size (e.g., particle size distribution) of the particles of boron carbide material, and the temperature and time of infiltration. For example, reactive infiltration involving large boron carbide particles and minimum exposure times at low temperatures will result in a partial conversion of the boron carbide to parent metal boron and parent metal carbon compound(s). As a consequence, unreacted boron carbide material can remain in the microstructure, which may impart desirable properties to the finished material for some purposes. Infiltration involving the boron carbide particles, high temperatures and prolonged exposure times (e.g., hold or dwell at high temperature after infiltration is complete) will tend to favor substantially complete conversion of the parent metal to the parent metal boride and carbon compound(s). Preferably, conversion of the boron carbide to the parent metal boride, parent metal boro compound(s) and parent metal carbide is at least about 50%, and most preferably at least about 90%. Infiltration at high temperatures and/or a subsequent high temperature treatment also may result in a strengthened metallic phase and/or densification of some of the composite constituents by a sintering process. In addition, as noted previously, the reduction of the amount of available parent metal below that necessary to form the boron and carbon compound(s) and fill the resulting interstices in the material may result in a porous body which also could have useful applications. In such a composite, porosity may vary from about 1 to 25 volume percent, and sometimes higher, depending upon the several factors or conditions enumerated above.

In a preferred embodiment of the present invention, a layer of boron carbide containing material is isopressed onto a graphite mandrel and then reactively infiltrated by a parent metal. The resultant body comprises the reactively infiltrated boron carbide layer having a cavity which substantially inversely replicates the surface geometry of the graphite rod, which optionally can be removed, for example, by drilling and/or grit blasting after the reactive infiltration process.

In another preferred embodiment of the present invention, a slurry of boron carbide containing material is sedimentation cast, or otherwise applied, onto or inside a graphite mandrel having protrusions and/or contours which may extend either part way or all the way through the preform. After reactively infiltrating the preform with a molten parent metal, the resultant self-supporting body will inversely replicate the surface geometry of the graphite mandrel. This procedure can be utilized to form shaped bodies having intricate surface geometries and/or through holes (e.g., a nozzle).

In a preferred embodiment of the present invention wherein a slurry, such as that described in the examples, is applied to a porous mold or mandrel having raised edges, so that the preform contacts at least two of such edges, the present invention allows the production of self-supporting bodies having a more accurate surface replication than previously discussed methods. Applicants believe that this improvement is due to the ability of the preforms formed by the methods discussed in this application to mold themselves to surfaces and resist shrinkage tendencies upon drying. Thus, the preforms maintain contact with the mold or mandrel and accordingly, prevent metal seepage around the sides of the preform which can lead to poor shape replication and/or porosity in the final product along the edges of the preform which were in contact with the mold or mandrel.

Moreover, the slurry may be sprayed onto a rotating or stationary mandrel. Further, the composition of the slurry may be altered or modified in order to provide a preform possessing a compositional gradient and/or distinct layers of differing characteristics (e.g., changing the B/C ratio during slurry deposition). For example, a tubular preform may be produced comprising differing layers of reactants which when contacted with molten parent metal form reaction products that are sufficient to induce compressive stresses in the formed composite (e.g., an outer reaction product layer possessing a relatively high coefficient of thermal expansion). Further, the surface characteristics (e.g., oxidation and/or wear resistance) of a composite may be altered or modified, for example, by spraying a slurry comprising an additive (e.g., TaC, $ZrB_2$, ZrC, etc.) and/or powdered parent metal onto at least a portion of the surface of the preform.

Another embodiment of the present invention utilizes a shaded body of parent metal which is coated with a preformed layer of boron carbide. The parent metal reactively infiltrates the boron carbide and leaves behind a cavity which inversely replicates the outer surface geometry of she shaped body of parent metal. A barrier layer (such as a graphite body) can be used on the outside of the boron carbide layer to limit or define the exterior geometry of the final self-supporting body.

In a still further embodiment, a plurality of preforms may be utilized together which, when contacted with molten metal, may form a unitary composite, (e.g., joining a plurality of preforms to produce an assembly which replicates the shape of the desired composite). Thus, the present invention permits providing a preform possessing a complex configuration which can be reacted with molten parent metal to form net or near-net shaped composites possessing a wide range of characteristics and shapes which may be utilized in a virtually unlimited array of product applications.

The following Examples illustrate the novel reaction products of this invention and the method by which they are prepared; however, these Examples are illustrative only and should not be interpreted as limiting the invention claimed.

EXAMPLE 1

This example demonstrates a technique whereby sediment cast preforms containing boron carbide are reactively infiltrated by zirconium parent metal.

A preform comprising boron carbide was sediment cast into an ATJ graphite crucible having inner dimensions of approximately 2 inches ×2 inches ×2 inches. The preform was formed by mixing approximately 2 grams of Dow experimental binder 40303.00 with 200 grams of 1000 mesh boron carbide (lot M10-D ESK) and 300 grams of methylene chloride. These components were mixed by the procedure described in the following sentences. In a ½ gallon size Nalgene jug, 300 grams of methylene chloride and 2 grams of Dow experimental binder 40303.00 were mixed until the binder was dissolved and in solution. At this point, approximately 200 grams of 1000 mesh boron carbide (ESK lot M10-D) was slowly stirred into the solution with a stainless steel spatula until the boron carbide was absorbed by the solution and no longer agglomerated.

The slurry was poured into the crucible and allowed to dry overnight. After drying, the slurry had formed an approximately 1.25 inch thick preform which filled the bottom of the crucible with no apparent gaps between the edges of the preform and the walls of the crucible.

After the preform had dried overnight, the crucible containing the preform was placed within a retort furnace at room temperature. The furnace was then evacuated to $1 \times 10^{-4}$ torr and backfilled with Graph 5 argon gas. After repeating this evacuation/backfill procedure three times, the furnace temperature was raised from room temperature to 350° C. in two hours; from 350° to 450° C. at 10° C. per hour; from 450° to 600° C. at 50° C. per hour; and held at 600° C. for one hour before cooling to room temperature in two hours. This procedure allows the binder to be burned off without affecting the structure of the preform.

After the binder was burned off, approximately 495.5 grams of zirconium sponge (Consolidated Astronautics lot 1015) was placed within the graphite crucible on top of the preform. The assembly, consisting of the graphite crucible and its contents was placed within a resistance heated vacuum furnace at room temperature. The furnace was then evacuated to $1\times10^{-4}$ torr and backfilled with argon. After the evacuation/backfill procedure had been performed twice, the furnace temperature was raised from room temperature to 350° C. in two hours; from 350° C. to 600° C. at 50° C. per hour; from 600° to 1900° C. in two hours; and held at 1900° C. for two hours before cooling to room temperature in one hour.

Examination of the assembly after removal from the furnace indicated that the zirconium parent metal had reactively infiltrated the boron carbide preform to form a self-supporting body. FIG. 4 is a photograph which shows a cross-section of the self-supporting body produced in this Example. As illustrated in the Figure, the body has a dense structure with little or no void space or porosity at the edges which were in contact with the crucible walls.

EXAMPLE 2

The procedure discussed above was repeated with a preform having an approximate thickness of 0.38 inches and prepared from a slurry comprising 1 gram of Dow Chemical experimental binder 40303.00, 200 grams of 1000 mesh boron carbide (lot M10-D ESK) and 300 grams of methylene chloride. The binder burnout step was performed in the same resistance heated vacuum furnace utilized for the infiltration step in this Example.

After the binder had been burned off, an approximately 223 gram ingot of commercially available Grade 702 zirconium having approximate dimensions of 1.98 inches $\times$ 1.98 inches $\times$ 0.525 inches, was placed within the crucible on top of the preform. The assembly, consisting of the graphite crucible and its contents was subjected to the same heating schedule outlined in Example 1. An examination of the assembly, after it had been removed from the furnace, indicated that the zirconium parent metal had reactively infiltrated the boron carbide preform. FIG. 5 is a photograph of a cross-section of the self-supporting body formed in this Example. Although the body contains some porosity, as illustrated in the Figure, the porosity is not located at the edges of the body which were in contact with the crucible.

EXAMPLE 3

The following example demonstrates a technique whereby a boron carbide slurry is isopressed on the outside of a graphite rod and reactively infiltrated with zirconium parent metal to permit the formation of a tube comprising the reaction product of the zirconium parent metal with the boron carbide and having a hollow core which inversely replicates the outer surface geometry of the graphite rod.

An isopress slurry was prepared by dissolving 10 parts of Dow experimental binder 40303.00 and 30 parts by weight Carbowax 8000 (supplied by Union Carbide) in 1500 parts by weight methylene chloride (J. T. Baker). When all of the carbowax 8000 and binder were dissolved in the methylene chloride, 1000 parts by weight boron carbide (500 mesh ESK lot A-87) was added and the resultant mixture was ball milled for 1.5 hours. After the ball milling, the mixture was poured into an aluminum foil container and allowed to sit until most of the methylene chloride had evaporated. The resultant semi-dry mixture was sieved through a metallic screen in order to break up any large agglomerates. The sieved mixture was allowed to dry to remove excess methylene chloride and then sieved through 20 mesh screen. The weight loss on drying at 110° C. for two hours should be approximately 7.75% of the total weight of the mixture. In any event, the mixture should have a consistency so that it will stick to the graphite rod upon isopressing to approximately 5000 psi.

A graphite rod (40) having an outer diameter of approximately 1 inch was coated with an isopressed layer (41) of boron carbide such that the outer diameter of the coated rod was approximately 1.6 inches. The isopressed boron carbide layer (41) was formed by isopressing the mixture described in the previous paragraph onto the outside of the graphite rod.

Figure 6:
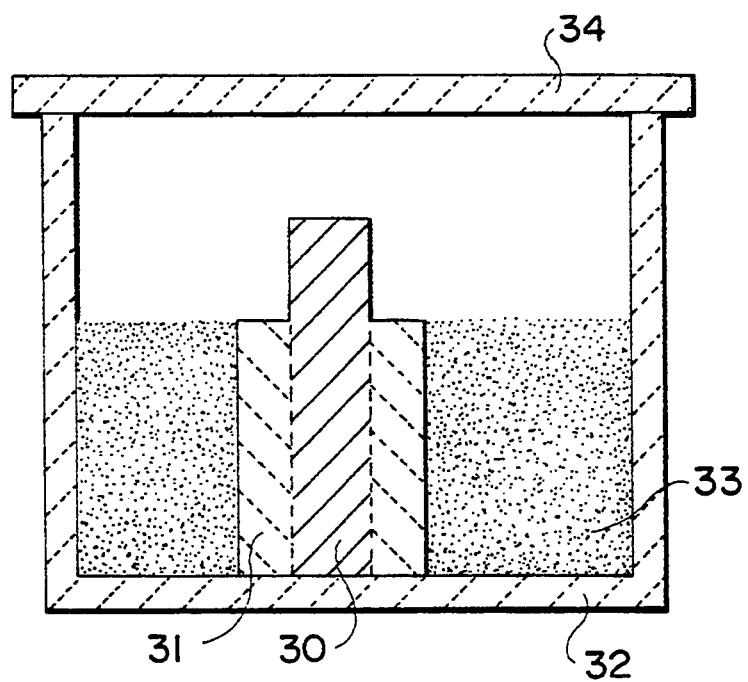
FIG. 6 is a cross-sectional view of the setup utilized to produce the body in Example 3.

The coated graphite rod (40) was cemented to the bottom of an ATJ graphite crucible (42) having an inner diameter of approximately 2.5 inches. The interior of the graphite crucible was then filled with Western Zirconium nuclear sponge (No. 15432) until the zirconium sponge (43) was approximately level with the top of the coated region of the graphite rod. A graphite cover (44) was placed on top of the graphite crucible (42) and the assembly, as illustrated in FIG. 6, was placed within a resistance heated vacuum furnace at room temperature. The furnace was then evacuated to approximately $1\times10^{-4}$ torr and backfilled with argon. After this evacuation/backfill procedure had been performed twice, the furnace temperature was raised from room temperature to 200° C. in two hours; held for one hour at 200° C.; heated from 200° to 350° C. at 20° C. per hour; heated from 350° C. to 450° C. in two hours; heated from 450° C. to 1750° C. in four hours; held for one hour at 1750° C.; heated from 1750° C. to 1900° C. in one hour; and held for two hours at 1900° C. After the two hour heating period at 1900° C., the furnace was turned off and allowed to cool naturally to room temperature. A visual examination of the assembly after removal from the furnace indicated that the zirconium parent metal had infiltrated the isopressed boron carbide layer to the graphite rod. The resultant body produced by the reactive infiltration process was strong and machinable. After removal of the graphite rod, it was noted that the interior of the body produced by the reactive infiltration process had replicated the outer surface of the graphite rod with a high degree of accuracy.

Examples 4 through 10 demonstrate processes which can be utilized to form self-supporting bodies having a predetermined shape. Examples 4–8 demonstrate the reaction of a molten parent metal with a boron carbide preform which has been formed around a graphite mandrel to permit the production of a tubular reaction product. Examples 9–10 demonstrate formation of a spherical composite.

EXAMPLE 4

A boron carbide slurry was prepared by first dissolving about 1% by weight (about 10 grams) of Dow Experimental Binder XUS 40303.00 and about 3% by weight (about 30 grams) of Carbowax 8000 in about 1500 grams of methylene chloride (J. T. Baker) to form a binder solution. The solution was then combined with about 10,000 grams of 1000 grit boron carbide (ESK, lot M10) in a mixing bowl and mixed (Hobart Model N-50 mixer) for about 30 minutes to form a slurry. The slurry was then screened to remove any agglomerates of unmixed constituents, dried in air for about 20 hours, and passed through a minus 40 mesh sieve.

A preform was then prepared by isostatically pressing (Autoclave isopressing apparatus) the slurry at a pressure of about 5000 psi around a graphite mandrel having an approximately ¼ inch outer diameter. The preform and mandrel were placed into a graphite crucible and heated in a retort furnace which was evacuated and backfilled with argon to remove the binder material. The furnace temperature was ramped from room temperature to about 200° C. in about 2 hours, maintained at about 200° C. for about 1 hour, then ramped to about 350° C. at a rate of about 20° C. per hour, then ramped to about 600° C. in about 5 hours. The furnace was then cooled to room temperature.

Approximately 35 grams of zirconium sponge (Western Zirconium nuclear sponge, Lot No. 4840) were added to the graphite crucible surrounding the isopressed preform. The entire assembly, comprising the crucible, the preform surrounding the graphite mandrel and the zirconium metal, was placed into a vacuum/inert atmosphere furnace (supplied by AVS). The furnace was twice evacuated to about $2 \times 10^{-4}$ torr and backfilled with argon gas (supplied by Airco Specialty Gases) flowing at a rate of about 2 liters/minute to provide a furnace chamber pressure of about 2 psig. The furnace temperature was raised from room temperature to about 1750° C. at a rate of about 200° C. per hour, held at about 1750° C. for about one hour, heated from about 1750° C. to about 1900° C., held at about 1900° C. for about 2 hours, then cooled to room temperature in 5 hours.

The assembly was then removed from the furnace and inspected. A self-supporting composite tube had formed comprising the reaction product of the zirconium metal and the boron carbide within the preform. The composite had an outer diameter of approximately 0.48 inches and a wall thickness of about 0.081 inches. The inner diameter of the formed composite substantially replicated the graphite mandrel surface.

Figure 7:
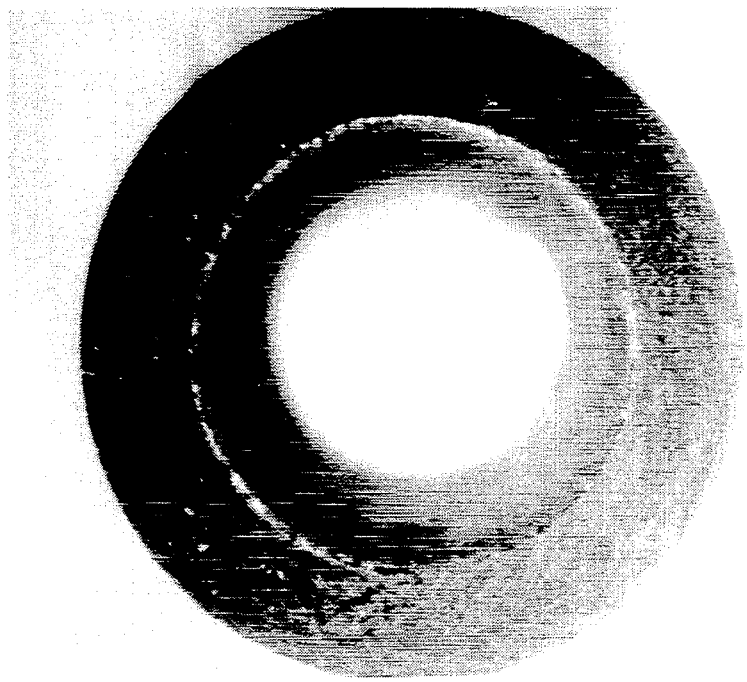
FIG. 7 is a photograph at 7.5× of a cross-sectional view of the self-supporting body produced in Example 4.
Figure 8:
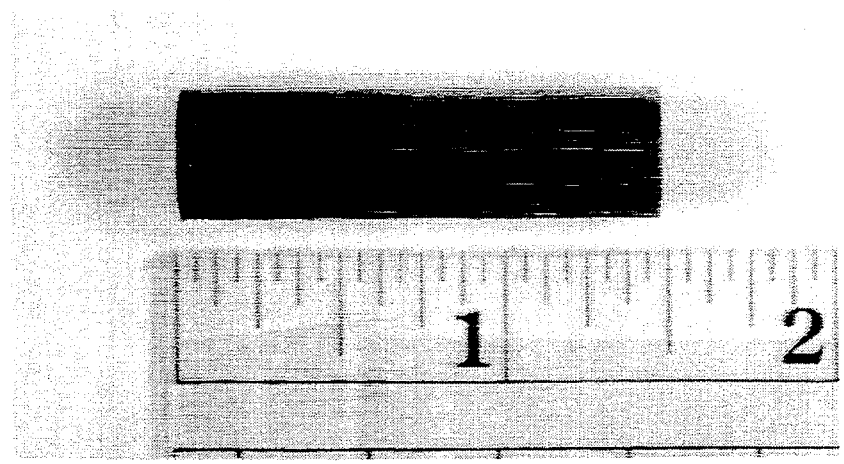
FIG. 8 is a photograph of a side view of the self-supporting body formed in Example 4 after diamond grinding of the outer diameter.
Figure 9:
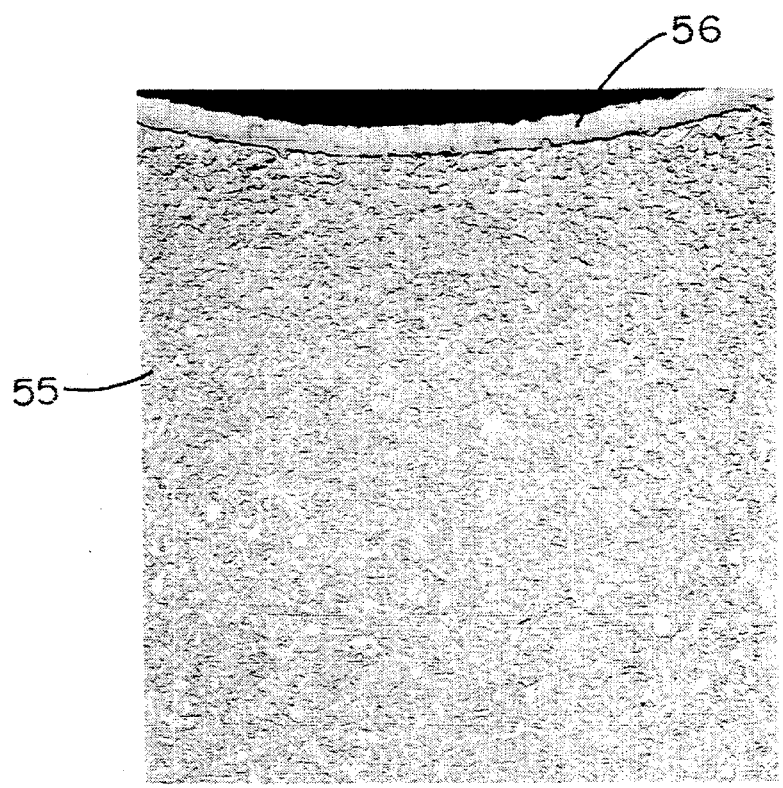
FIG. 9 is a photomicrograph at 50× of a portion of the self-supporting body formed in Example 4.
Figure 10:
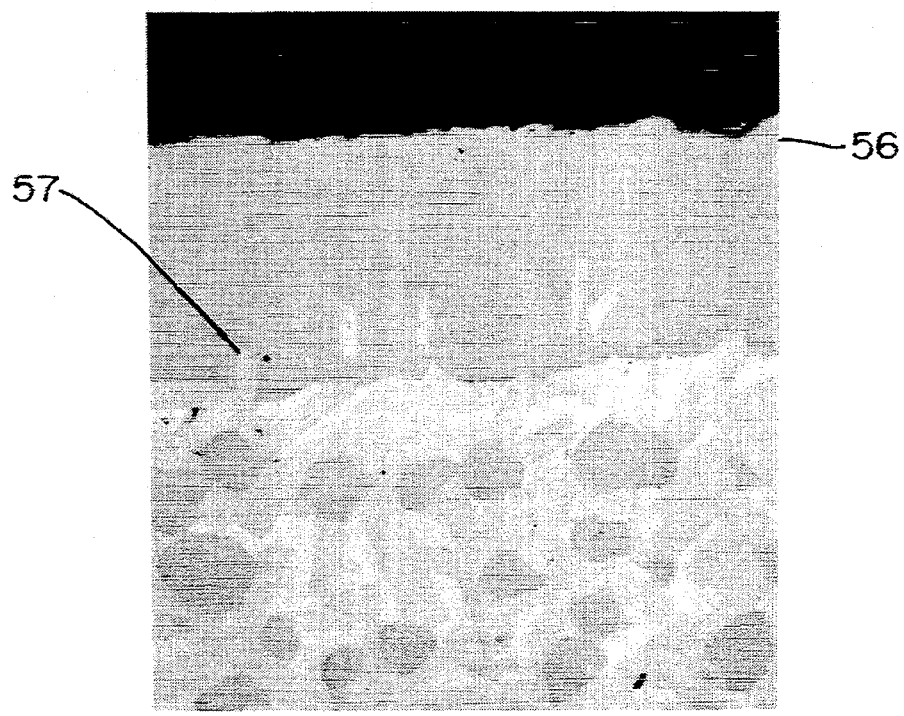
FIG. 10 is a photomicrograph at 400× of a portion of the self-supporting body formed in Example 4.

FIG. 7 is a photograph of a cross-section of the composite formed according to this Example. FIG. 8 is a photograph taken perpendicular to the longitudinal axis of the composite tube after grinding the outer circumference. FIG. 9 is a photomicrograph at 50× magnification of a section of the composite formed according to this Example showing the microstructure of the formed composite. As shown in FIG. 9, the formed composite comprises a zirconium carbide-zirconium boride body 55 with an inner layer 56 comprising $ZrC_{1-x}$. FIG. 10 is a photomicrograph at 400× showing the dense, uniform and adherent layer 56 of $ZrC_{1-x}$ formed on the inner diameter of the tube due to a reaction of the zirconium parent metal with the graphite mandrel. In some areas, platelets of $ZrB_2$ 57 from the surrounding regions extend into the carbide layer (i.e., $ZrC_{1-x}$).

Moreover, a mid-wall region of the tubular self-supporting body formed according to this Example was tested and found to have an average hardness of about 79.9±0.5 HRA. The inner carbide layer 56 of the tubular body had a Vickers microhardness of about 1660 kg/mm (50 g/load).

EXAMPLE 5

A boron carbide slurry was prepared by first dissolving about 30 grams of Dow Experimental Binder XUS 40303.00 in about 300 grams of deionized $H_2O$ to form a binder solution. The solution was then combined with about 1000 grams of 1000 grit boron carbide (ESK Lot M11) in a mixing bowl and mixed (Hobart Model N-50 mixer) for about 30 minutes to form a slurry. The resultant slurry was screened to remove any agglomerates of unmixed constituents, dried in air for about 20 hours, then passed through a minus 40 mesh sieve.

A preform was then prepared by isostatically pressing (autoclave isopressing apparatus) the slurry at a pressure of about 500 psi around a graphite rod having an approximately one inch outer diameter. The preform and graphite rod were then placed into a graphite crucible and heated in a retort furnace which was evacuated and backfilled with argon to remove the binder material. The furnace temperature was ramped from room temperature to about 200° C. in about 2 hours, maintained at about 200° C. for about 1 hour, then ramped to about 350° C. at a rate of about 20° C. per hour, then ramped to about 600° C. in about 5 hours. The furnace was then cooled to room temperature, and the preform/rod assembly was removed.

The graphite rod surrounded by the preform was cemented to the bottom of a graphite crucible using Graphibond® 551-R graphite cement (Aremco). A zirconium metal pipe (Zr 702, Heat No. 1166), weighing about 23 grams, and having an inner diameter of about 0.62 inches, an outer diameter of about 0.84 inches, and measuring about 0.75 inches in length, was placed around the preform. The entire assembly, comprising the crucible, the preform/graphite rod assembly and the zirconium metal pipe, was placed into a vacuum/inert atmosphere furnace. The furnace was evacuated to about $2 \times 10^{-4}$ torr and backfilled with argon gas (supplied by Airco Specialty Gases). The furnace was heated substantially under vacuum from room temperature to about 1000° C. At a furnace temperature of about 1000° C., argon was introduced into the furnace at a rate of about 2 liters/minute to create a chamber pressure of about 2 psig. The furnace temperature then raised from about 1000° C. to about 1900° C. (total time for heating from room temperature to about 1900° C. was about 9 hours), held at 1900° C. for about 2 hours, cooled to 1500° C. in 2 hours and then cooled to room temperature in about 6 hours.

The formed composite was removed from the assembly and inspected. It was observed that a self-supporting composite tube, measuring approximately 0.55 inches thick, had been formed comprising $ZrB_2$, $ZrC$, and $Zr$ metal.

EXAMPLE 6

The method of Example 5 was substantially repeated, with the exception that the diameter of the graphite mandrel utilized to form the preform measured about 1-⅜ inches in diameter and the zirconium pipe employed was a Schedule 40 Zr 702 (Heat No. 5988) weighing approximately 318 grams. The resultant formed composite measured about 1.2 inches thick with a relatively smooth inside diameter.

EXAMPLE 7

This example demonstrates that boron carbide powder can be sprayed onto a mold or mandrel to form a preform which provides a desired configuration to the final composite body. Specifically, a boron carbide spray mixture was formulated by mixing about 99.7% by weight acetone with about 0.3% by weight Dow Experimental Binder XUS 40303.00, and adding about 3.04 grams of 500 grit boron carbide (ESK lot M-36).

The boron carbide mixture was sprayed onto an ATJ graphite mandrel, having an approximately 0.5 inch outside diameter, with a Badger model 150 spray gun at about 20 psi air pressure, while holding the gun approximately 4 inches from the mandrel. The slurry was then permitted to dry into a preform, and the preform was sanded to permit insertion of the preform/mandrel assembly into a zirconium 702 pipe (Heat No. 1166) weighing about 53 grams having an approximately 0.622 inch inner diameter. This assembly was placed within an ATJ graphite crucible, and the crucible, containing the preform/graphite mandrel assembly and the zirconium pipe, was placed into a vacuum/inert atmosphere furnace. The furnace was twice evacuated to about $2 \times 10^{-4}$ torr and then backfilled with argon gas (supplied by Airco Specialty Gases) at an argon flow rate of about 2 liters/minute to establish a furnace chamber (gauge) pressure of about 2 psig. The furnace was then heated from room temperature to about 1900° C. in about 15 hours, held at about 1900° C. for about one hour, then cooled to room temperature in about 8 hours.

The preform was removed from the assembly, and it was discovered that a composite tube had formed having a wall thickness of approximately 0.15 inches.

This procedure was substantially repeated by utilizing about 4.85 grams of 500 grit boron carbide and a zirconium pipe which weighed about 52 grams. The resulting formed composite tube had a wall thickness of about 0.14 inches.

Example 8

This example further demonstrates that boron carbide powder can be sprayed onto a mold or mandrel to form a preform which provides a desired configuration to the final composite body.

A boron carbide spray mixture was formulated by mixing about 99.7% by weight methyl ethyl ketone (MEK) with about 0.3% by weight Dow experimental binder XUS 40303.00, and adding about 4.52 grams of 500 grit boron carbide (ESK lot M-36).

The boron carbide mixture was sprayed onto an ATJ grade graphite mandrel, having an approximately 0.5 inch outside diameter with a Badger model 150 spray gun at about 20 psi air pressure while holding the gun approximately 4 inches from the mandrel. The slurry was then permitted to dry into a preform, and the preform was sanded to permit insertion of the preform/mandrel assembly into a 702 grade zirconium pipe (Heat No. 1166) weighing about 52.5 grams and having an approximately 0.622 inch inner diameter. The assembly was placed into an ATJ graphite crucible and the crucible, containing the preform/graphite mandrel assembly and the zirconium pipe was placed into a vacuum/inert atmosphere furnace. The furnace was twice evacuated to about $2 \times 10_{-4}$ torr and then backfilled with argon gas (supplied by Airco Specialty Gases) at an argon flow rate of about 2 liters/minute to establish a furnace chamber pressure of about 2 psig. The furnace was then heated from room temperature to about 1900° C. in about 15 hours, held at about 1900° C. for about one hour, then cooled to room temperature in about 8 hours.

The preform was removed from the assembly and it was discovered that a self-supporting composite tube had formed having a wall thickness of approximately 0.133 inches.

This procedure was repeated utilizing about 5.13 grams of 500 grit boron carbide and a zirconium pipe which weighed about 53 grams. The formed composite tube had a wall thickness of about 0.133 inches.

SAMPLE 9.

This example demonstrates the formation of a shaped composite body having a spherical configuration.

A spherical ATJ graphite mold having an approximately 1.26 inch inner diameter, with a vent hole on the bottom, was filled with about 15.22 grams of 500 grit boron carbide (ESK lot M-36A). The graphite mold and its contents were tapped on a tap density meter (Model No. 2003, Stampfvolumeter, J. Englesmann A. G. West Germany) approximately 500 times to settle the boron carbide within the graphite mold. A portion of the preformed boron carbide in the center of the graphite mold was hollowed out by hand utilizing a lab spoon, and approximately 170 grams of 705 grade zirconium metal was placed on top of the hollowed out boron carbide preform.

The assembly was placed into a vacuum/inert atmosphere furnace which was evacuated and backfilled twice with argon gas (supplied by Airco Specialty Gases). The furnace was heated to about 1000° C., at which point an argon gas flow was initiated in the furnace at a flow rate of about 2 liters/minute to establish a furnace chamber pressure of about 2 psig. The furnace was then heated to about 1900° C., with the total time for heating from room temperature to about 1900° C. taking about 8 hours. The furnace temperature was held at about 1900° C. for about 2 hours, then cooled to room temperature in about 12 hours.

The graphite mold was removed from the furnace and inspected. It was discovered that a substantially spherical self-supporting composite had been formed measuring about 1.26 inches in diameter. Example 10

This example demonstrates a further method for forming a spherical composite within a graphite mold.

A spherical ATJ graphite mold having an approximately 1.26 inch inner diameter with a vent hole on the bottom, was filled with about 15.38 grams of 500 grit boron carbide (ESK lot M-36A). The mold was tapped approximately 500 times on a tap density meter (Model No. 2003, Stampfvolumeter, J. Englesmann A. G., West Germany) to settle the boron carbide within the graphite mold. A portion of the preformed boron carbide in the center of the graphite mold was hollowed out by hand utilizing a lab spoon, and about 154 grams of zirconium metal sponge (Western Zirconium, nuclear grade, Lot No.5092-A) were placed on top of the hollowed out boron carbide preform, wherein the Zr to boron carbide weight ratio was about 10:1.

The assembly was placed into a vacuum/inert atmosphere furnace which was evacuated and backfilled twice with argon gas (supplied by Airco Specialty Gases). The furnace was heated to about 1000° C., at which point out an argon gas flow was initiated in the furnace at a rate of about 2 liters/minute to establish a furnace chamber pressure of about 2 psig. The furnace was then heated to about 1900° C., with the total time for heating from room temperature to about 1900° C. taking about 8 hours. The furnace temperature was held at about 1900° C. for 2 hours and then cooled to room temperature in about 12 hours.

The graphite mold was removed from the furnace and inspected. It was discovered that a substantially spherical self-supporting composite measuring about 1.26 inches in diameter had been formed. Example 11

This Example demonstrates the fabrication of a self-supporting composite body in the shape of a tube.

About 300 grams of methylene chloride solvent were poured into a ½ gallon (2 L) plastic jug. About 2 grams of XUS 40303.00 Experimental Binder (Dow Chemical Co., Midland, Mich.) were dissolved into the methylene chloride to form a binder solution. About 200 grams of 1000 grit TETRABOR ® boron carbide particulate (ESK Engineered Ceramics Company, New Caanan, Conn.) were slowly stirred into the binder solution in the plastic jug to form a slip. The slip was then poured into a Grade AGSX graphite crucible (Union Carbide Corporation, Carbon Products Division, Danbury, Conn.) measuring about 2 ½ inches (64 mm) in inside diameter and about 3¼ inches (83 mm) high, until the graphite crucible was substantially filled. Because methylene chloride solvent was drawn into the pores in the graphite crucible, it was necessary to add additional slip to maintain the height of the slip. After a layer of boron carbide particulate had built up on the inside wall of the graphite crucible to a thickness of about ¼ inch (6 mm), the residual slip was poured back into the plastic jug. The developing preform inside the graphite crucible was allowed to dry in a drying box at room temperature in order to control the rate of evaporation of the methylene chloride solvent. After drying for about 20 hours, the graphite crucible/boron carbide preform assembly was removed from the drying box, placed into a forced air drying oven, and dried at a temperature of about 70° C. for about four hours. The graphite crucible/boron carbide preform assembly was then removed from the forced air drying oven and placed into a resistance heated controlled atmosphere furnace for the purpose of removing the binder. The furnace chamber was evacuated to about 30 inches (762 mm) of mercury vacuum and then back-filled with argon gas. After repeating this evacuation and back-filling procedure two more times, an argon gas flow rate of about one liter per minute through the furnace chamber was established. The furnace temperature was then increased from about room temperature to about 350° C. at a rate of about 130° C. per hour. After maintaining a temperature of about 350° C. for about two hours, the temperature was then increased to about 450° C. at a rate of about 10° C. per hour. Upon reaching a temperature of about 450° C., the temperature was then increased to about 600° C. at a rate of about 50° C. per hour. After maintaining a temperature of about 600° C. for about three hours, substantially all of the binder had volatilized. The furnace temperature was then decreased to about room temperature at a rate of about 300° C. per hour. After the furnace had cooled to about room temperature, the graphite crucible/boron carbide preform assembly was removed from the furnace. The boron carbide preform was then separated from the graphite crucible and weighed. The preform had a mass of about 65.6 grams and a configuration substantially identical to the interior cavity of the graphite crucible, with dimensions measuring about 1⅞ inches (48 mm) in outside diameter by about 1⅜ inches (35 mm) in inside diameter by about 3¼ inches (83 mm) high. The bulk density of the preform was calculated to be about 0.9 grams per cubic centimeter, or about 40% of theoretical density.

The preform was placed open-end-up into a graphite boat measuring about 2.0 inches (51 mm) square and about 3.0 inches (76 mm) high. About 106 grams of commercially pure zirconium sponge (Consolidated Astronautics Division of United-Guardian, Inc., Happauge, N.Y.) was poured into the preform and levelled to form a lay-up.

The graphite boat and its contents were then placed into a vacuum furnace. The furnace chamber was evacuated to about 30 inches (762 mm) of mercury and back-filled with argon gas. After repeating this evacuation and backfilling operation two more times, an argon gas flow rate of about 500 cubic centimeters per minute through the furnace chamber at an over pressure of about 1 psi (7 kPa) was established. The furnace temperature was then increased from about room temperature to a temperature of about 1900° C. at a rate of about 235° C. per hour. After maintaining a temperature of about 1900° C. for about two hours, the furnace temperature was decreased at a rate of about 340° C. per hour. When the furnace had cooled to a temperature of about 50° C., the graphite boat and its contents were removed from the furnace.

The formed composite and its contents were removed from the graphite boat. Unreacted boron carbide particulate on the outer surface of the formed composite was removed to by sandblasting to reveal the self-supporting composite body. Some residual zirconium metal adhered to the inside of the formed body.

Figure 11A:
FIGS. 11A and 11B are photographs of the self-supporting body formed in Example 11.
Figure 11B:
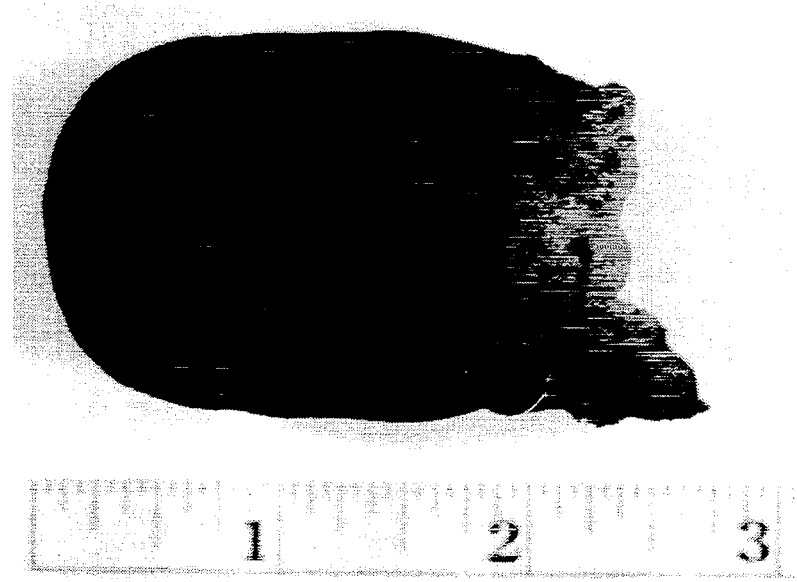

It was observed that the top of the preform (i.e., that portion adjacent to the open end) had not reacted to completion due to an insufficient supply of molten parent metal at the open end of the preform. The incomplete reaction manifested itself as a somewhat thinner wall of the platelet reinforced composite body near the open end of the tube shape. Photograph of the formed platelet reinforced composite tube are shown in FIGS. 11A and 11B.

Example 12

Figure 12:
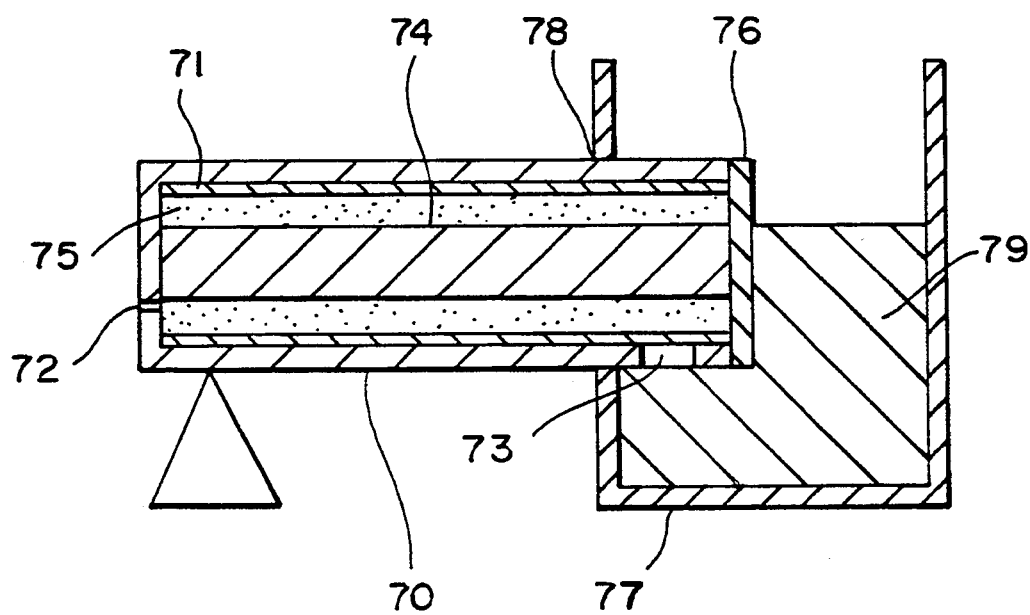
FIG. 12 is a cross-sectional view of a set up used to form the self-supporting body of Example 12.

This Example demonstrates the concept of defining a preform by confining a tap loaded filler material between a mandrel and the interior walls of a crucible. The setup for carrying out the reactive infiltration of this preform by a parent metal is shown schematically in FIG. 12.

A Grade ATJ graphite crucible 70 (Union Carbide Corporation, Carbon Products Division, Danbury, Conn.) measuring about 1½ inches (38 mm) in inside diameter by about 3.5 inches (89 mm) in length was placed vertically on a support means with the open end of the crucible 70 facing up. A sheet of GRAFOIL ® graphite foil (Union Carbide Corporation, Carbon Products Division, Danbury, Conn.) measuring about 3.5 inches (89 mm) long by about 15 mils (0.38 mm) thick was wrapped one time around a mandrel overlapped by ¼ inch (6 mm). The overlapped region of the graphite foil was bonded together with RIGID-LOCK ® colloidal graphite cement (Polycarbon Corporation, Valencia, Calif.). After curing the colloidal graphite cement for about ½ hour in the air at ambient temperature, the cemented graphite foil sheet wound on the mandrel was removed from the mandrel. The resulting cemented graphite foil in the shape of a tube measuring about 1.33 inches (34 mm) in diameter was centered inside the graphite crucible 70 and cemented to its base using RIGIDLOCK ® colloidal graphite cement (Polycarbon Corporation, Valencia, Calif.). After thoroughly drying the colloidal graphite cement, molten zirconium was cast into the cavity between the graphite crucible 70 and the graphite foil sheet to form a zirconium body 71 in the shape of a tube. The graphite foil on the inside of the formed zirconium tube was removed by grit blasting. The zirconium metal which was melted to make the casting comprised zirconium sponge (Western Zirconium, Ogden, Utah). The mass of the cast zirconium totalled about 130 grams.

An approximately 1/16 inch (1.6 mm) diameter hole 72 was drilled through bottom of the graphite crucible to serve as a vent for entrapped gas during the subsequent composite fabrication process. At approximately ⅜ inch (9.5 mm) diameter hole 73 was drilled through the side of the graphite near the top of the crucible 70 (i.e., the open end of the crucible). In the subsequent composite forming process this hole served to connect the zirconium tube 71 to an external zirconium metal reservoir.

A Grade ATJ graphite mandrel 74 (Union Carbide Corporation, Carbon Products Division, Danbury, Conn.) measuring about 0.85 inch (22 mm) in diameter by about 3.5 inches (89 mm) in length was centered inside of the zirconium tube 71 contained within the graphite crucible 70 and cemented to the base of the crucible 70 using RIGIDLOCK ® colloidal graphite cement (Polycarbon Corporation, Valencia, Calif.). TETRABOR ® boron carbide particulate 75 (ESK Engineered Ceramics Company, New Caanan, Conn.) having an average particle size of about 5 microns in diameter was tap loaded into the cavity between the cast zirconium tube 71 and the graphite mandrel 74 using a Model 2003 STAV tap volume meter (Stampfvolumeter, J. Engellmann, A. G., Federal Republic of Germany). A total of about 45 grams of the boron carbide particulate 75 was loaded into the developing lay-up. The bulk density of the tap loaded boron carbide 75 was about 40% of theoretical. A Grade ATJ graphite disk 76 (Union Carbide Corporation, Carbon Products Division, Danbury, Conn.) having substantially the same diameter as the outside diameter of the graphite crucible 70 and substantially the same thickness as the wall thickness of the graphite crucible 70 was cemented to the open end of the graphite crucible 70 using RIGIDLOCK ® colloidal graphite cement (Polycarbon Corporation, Valencia, Calif.) to seal off the end of the graphite crucible 70 and thus help confine the zirconium metal during the subsequent composite fabrication process.

A hole 78 having substantially the same diameter as that of the graphite crucible was drilled into a Grade ATJ graphite boat 77 (Union Carbide Corporation, Carbon Products Division, Danbury, Conn.) measuring about 2.0 inches (51 mm) square by about 3¼ inches (83 mm) high. The graphite crucible 70 and its contents were then inserted into the graphite boat 77 to a point at which substantially all of the previously drilled ⅜ inch (10 mm) diameter hole 73 in the graphite crucible 70 was substantially completely inside of the graphite boat 77. The graphite crucible 70 and its contents were then rotated such that the ⅜ inch (10 mm) diameter hole 73 was facing substantially downward. The graphite crucible was then cemented to the graphite mold 77 at the junction using RIGIDLOCK ® colloidal graphite cement (Polycarbon Corporation, Valencia, Calif.). About 255 grams of zirconium sponge 79 (Western Zirconium, Ogden, Utah) was shaken into the graphite mold to complete the lay-up. The additional zirconium sponge 79 subsequently served as a parent metal reservoir to assist in the reactive infiltration of molten zirconium metal into the boron carbide tap loaded preform.

The lay-up was placed into a vacuum furnace at about room temperature. The furnace chamber was evacuated to about 30 inches (762 mm) of mercury vacuum using a mechanical roughing pump. Upon reaching about 30 inches (762 mm) of mercury vacuum, a high vacuum source was allowed to communicate with the vacuum chamber, and the total pressure in the chamber was thereby reduced to about $1.8 \times 10^{-5}$ torr. Upon reaching the final working pressure of about $1.8 \times 10^{-5}$ torr, the furnace was heated to about 2000° C. at a rate of about 220° C. per hour. Upon reaching a temperature of about 400° C., the vacuum chamber was back-filled with argon gas. An argon gas flow rate of about two liters per minute through the vacuum chamber at an over pressure of about 2 psig (14 kPag) was established. The furnace continued to heat at a rate of about 220° C. per minute under this argon atmosphere. After maintaining a temperature of about 2000° C. for about two hours, the furnace temperature was decreased to about 1500° C. at a rate of about 125° C. per hour. Upon reaching a temperature of about 1500° C., the furnace temperature was further decreased to about room temperature at a rate of about 185° C. per hour. When the furnace had cooled to about room temperature, the lay-up was removed from the furnace and disassembled to reveal that a platelet reinforced composite body having substantially the configuration of the boron carbide tap loaded preform had been formed.

Figure 13:
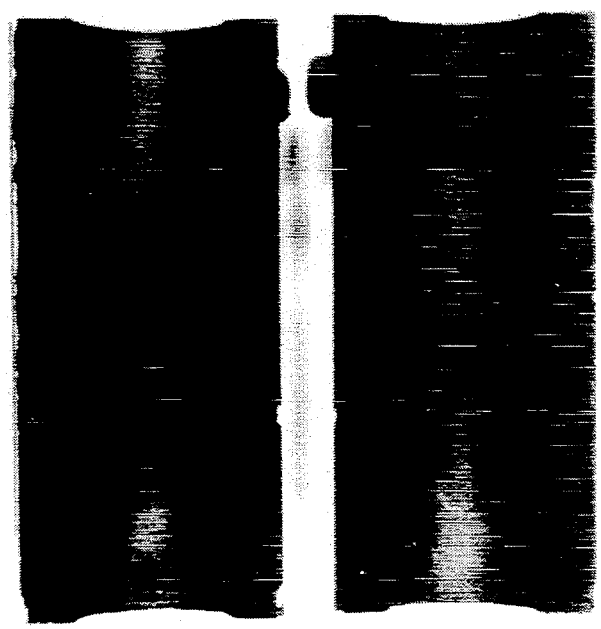
FIG. 13 is a photograph of the self-supporting body formed in Example 12.

The formed platelet reinforced composite tube was sectioned longitudinally using electro-discharge machining. Some residual unreacted metal which was located at the interior surface of the formed platelet reinforced tube was removed by grit blasting. A photograph of the sectioned halves of the formed tube are shown in FIG. 13. Quantitative image analysis of a section of the formed platelet reinforced composite body which was sectioned, mounted, and polished for optical microscopy revealed that the composite body comprised about 20-25 volume percent of residual metal.

This Example illustrates a technique for continuously supplying parent metal over the entire surface of a tap loaded preform to produce a net-shape platelet reinforced composite body in the shape of a tube. The continuous supply of parent metal over the entire reaction front contributed significantly to uniform and complete reactive infiltration of the tap loaded boron carbide tube preform.

Example 13

A graphite mold was prepared by drilling holes for receiving graphite rods in opposing sidewalls of an approximately 3 inch (76 mm) long by about 3 inch (76 mm) high by about 3 inch (76 mm) deep graphite crucible (Grade ATJ, Union Carbide).

Specifically, two evenly spaced holes having inner diameters measuring about 0.25 inch (6. mm) were drilled into a first sidewall of the graphite mold about 0.75 inch (19 mm) from the bottom of the graphite mold. In addition, two evenly spaced holes having inner diameters measuring about 0.25 inch (6.4 mm) were drilled into a second sidewall, opposed to the first sidewall of the graphite mold, about 0.75 inch (19 mm) from the bottom of the graphite mold. Two graphite rods, made from Grade AGSX graphite (Union Carbide Corporation, Carbon Products Division, Cleveland. Ohio), were inserted into the holes within the opposing sidewalls and through the inner cavity of the graphite mold. The graphite rods measured about 3.5 inches (89 mm) long and had an outer diameter of about 0.25 inch (6.4 mm) and were secured by gluing with GRAPHI-BOND ® 551-R graphite cement (Aremco Product, Inc., Ossining, N.Y.). The graphite mold containing the graphite rods was placed into an air atmosphere furnace at about 150° C. and held at about 150° C. for about 3 hours to set the graphite cement. the graphite mold was then removed from the furnace and allowed to cool to about room temperature.

About 190 grams of TETRABOR ® 1000 grit (average particle diameter if about 5 μm) boron carbide powder (ESK Engineered Ceramics, New Canaan, Conn.) were placed into the graphite mold and around the two graphite rods. The graphite mold was tapped at least 500 times using a tap volume meter (mode 2003 stampfvolumeter, J. Engelsmann A. G., West Germany) to settle the boron carbide powder within the graphite mold. About 1583 grams of zirconium sponge (Western Zirconium, Ogden, Utah) were placed into the graphite mold and on the tapped loaded boron carbide powder to form a lay-up.

The lay-up and its contents were then placed into a vacuum furnace and the furnace door was closed. The vacuum furnace chamber was evacuated to about $0.6 \times 10^{-4}$ torr in about 4 hours and then filled with argon flowing at a rate of about 2 liters per minute and an over pressure of about 2 pounds per square inch (0.14 kilograms per square centimeter). the vacuum furnace and its contents were then heated from about room temperature to about 1900° C. in about 9 hours while maintaining an argon flow rate of about 2 liters per minute and an over pressure of about 2 pounds per square inch (0.14 kilo grams per square centimeter). After about 2 hours at about 1900° C., the vacuum furnace and its contents were cooled to about 1800° C. at about 10° C. per hour. After about 12 hours at about 1800° C., to homogenize the microstructure of the resultant ceramic matrix composite body, the vacuum furnace and its contents were first cooled from about 1800° C. to about 1500° C. in about 4 hours and then from about 1500° C. to about room temperature in about 6 hours. At about room temperature, the flowing argon into the chamber of the vacuum furnace was interrupted and the vacuum furnace door was opened to reveal that the zirconium sponge had melted and reactively infiltrated the boron carbide powder to form a ceramic matrix composite body.

While the present invention has been disclosed in its preferred embodiments, it is to be understood that the invention is not limited to the precise disclosure contained herein, but may otherwise be embodied in various changes, modifications, and improvements which may occur to those skilled in the art, without departing from the scope of the invention as defined in the appended claims.

What is claimed is:

1. A method of producing a self-supporting body comprising:

contacting at least one material in slurry form comprising at least one material selected from the group consisting of boron carbide, a mixture of boron carbide and a carbon donor material, a mixture of boron carbide and a boron donor material and a mixture of a carbon donor material and a boron donor material, with a porous mold or mandrel having raised edges, so that the material contacts at least two of said edges, said contacting being effected by at least one process selected from the group consisting of sedimentation casting, slip casting, uniaxial pressing, tape casting, isostatic pressing, spray coating and tapping, to form at least one preform upon drying of said slurry in contact with said mold;

heating a parent metal in a substantially inert atmosphere to a temperature above its melting point to form a body of molten parent metal and communicating said body of molten parent metal with said at least one preform;

maintaining said temperature for a time sufficient to permit infiltration of said molten parent metal into said at least one preform and to permit reaction of said molten parent metal with at least a portion of said at least one preform;

maintaining sufficient contact of said at least one preform with said mold during said infiltration so as to prevent seepage of said parent metal between said at least one preform and said mold surface; and continuing said infiltration reaction for a time sufficient to produce said self-supporting body comprising at least one compound selected from at least one parent metal boron-containing compound and at least one parent metal carbon-containing compound, whereby said self-supporting body substantially replicates at least a portion of said at least one preform.

2. The method according to claim 1, wherein said mold comprises a graphite mandrel.

3. The method according to claim 1, wherein said at least one preform further comprises at least one inert filler material.

4. The method according to claim 1, wherein said preform comprises a cross-section which is variable in composition.

5. The method according to claim 1, wherein parent metal comprises at least one metal selected from the group consisting of aluminum, zirconium, silicon, titanium, hafnium, lanthanum, iron, calcium, vanadium, niobium, tantalum, tungsten, magnesium, chromium, molybdenum, zirconium, beryllium, and alloys thereof.

6. The method according to claim 1, wherein said at least one material comprises a mixture of a carbon donor material and a boron donor material.

7. The method according to claim 6, wherein said mold comprises a graphite mandrel.

8. The method according to claim 5, wherein said at least one preform further comprises at least one inert filler material.

9. The method according to claim 2, wherein said preform comprises a cross-section which is variable in composition.

10. The method according to claim 6, wherein said preform comprises a cross-section which is variable in composition.

11. The method according to claim 7, wherein said preform comprises a cross-section which is variable in composition.

12. The method according to claim 6, wherein said parent metal comprises at least one metal selected from the group consisting of aluminum, zirconium, silicon, titanium, hafnium, lanthanum, iron, calcium, vanadium, niobium, tantalum, tungsten, magnesium, chromium, molybdenum, zirconium, beryllium, and alloys thereof.

13. The method of claim 5, wherein said parent metal comprises at least one metal selected from the group consisting of zirconium, titanium and hafnium.

14. The method of claim 1, wherein said parent metal comprises zirconium.

15. The method of claim 1, wherein the characteristics of said self-supporting body are controlled by varying at least one of the composition and loading of said material within said at least one preform.

16. The method of claim 1, wherein said molten parent metal is contacted with said at least one preform by at least one technique selected from the group consisting of providing a reservoir of molten parent metal and surrounding said at least one preform with molten parent metal.

17. The method of claim 1, wherein the surface characteristics of said self-supporting body are altered by providing an additive material onto at least a portion of the surface of said at least one preform.

18. The method of claim 17, wherein said additive material comprises at least one material selected from the group consisting of tantalum carbide, zirconium diboride, zirconium carbide and powdered parent metal.

19. The method of claim 1, wherein said at least one preform comprises a plurality of preforms.

* * * * *